April 8, 1947.     E. H. LEHMAN     2,418,778

FRICTION SHOCK ABSORBER

Filed March 13, 1944

Inventor
Edward H. Lehman
By Henry Fuchs
Atty.

Patented Apr. 8, 1947

2,418,778

UNITED STATES PATENT OFFICE 2,418,778

FRICTION SHOCK ABSORBER

Edward H. Lehman, Chicago, Ill., assignor to W. H. Miner, Inc., Chicago, Ill., a corporation of Delaware Application March 13, 1944, Serial No. 526,203

3 Claims. (Cl. 267—9)

This invention relates to improvements in friction shock absorbers, especially adapted for snubbing or dampening the action of railway car truck springs.

One object of the invention is to provide a friction shock absorber including a plurality of relatively movable spring friction members slidably engaging each other, wherein the spring friction members are in the form of resilient bars held in frictional contact with each other due to their inherent resiliency.

A more specific object of the invention is to provide a friction shock absorber, comprising end followers; a cylindrical spring bar projecting from one of said followers; a pair of cylindrical spring bars projecting from the other follower engaging the first named bar and having lengthwise sliding engagement therewith; and a spring surrounding said bars and bearing at opposite ends on said followers to yieldingly resist relative longitudinal movement of the friction bars.

Other objects of the invention will more clearly appear from the description and claims hereinafter following.

Figure 1:
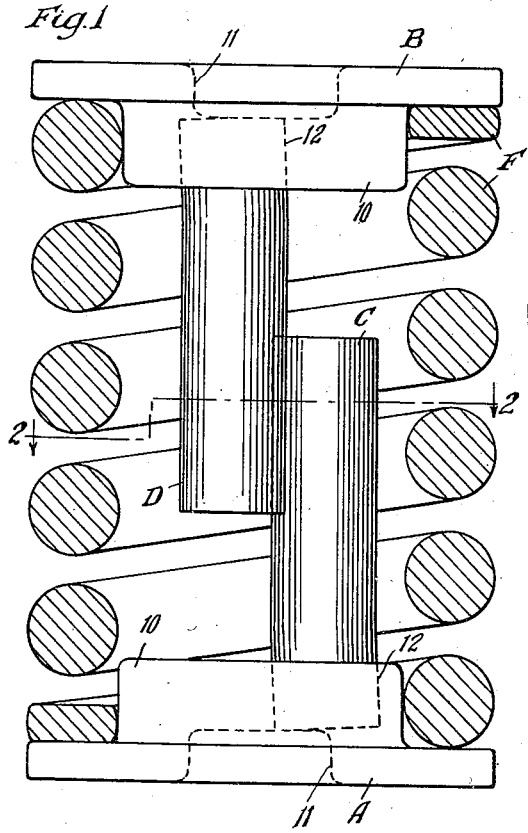
Figure 3:
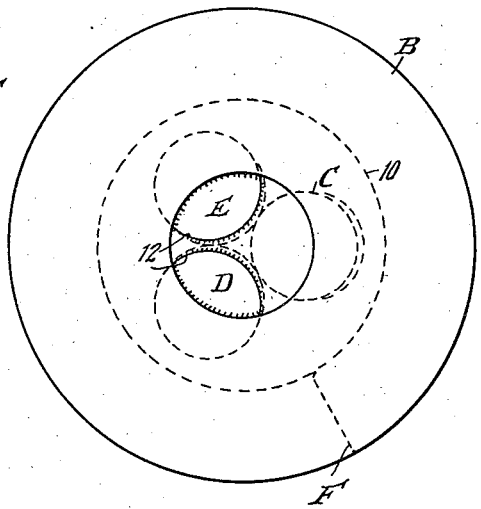
Figure 2:
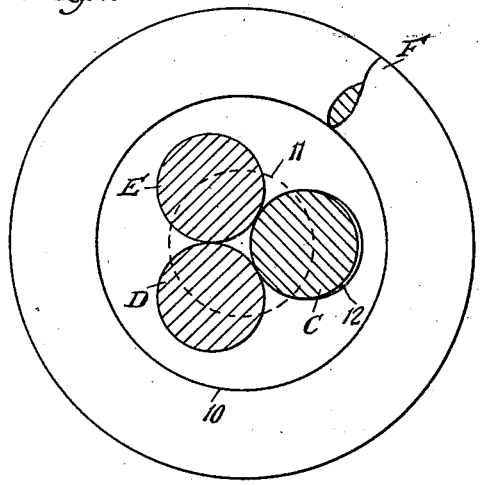
Figure 4:
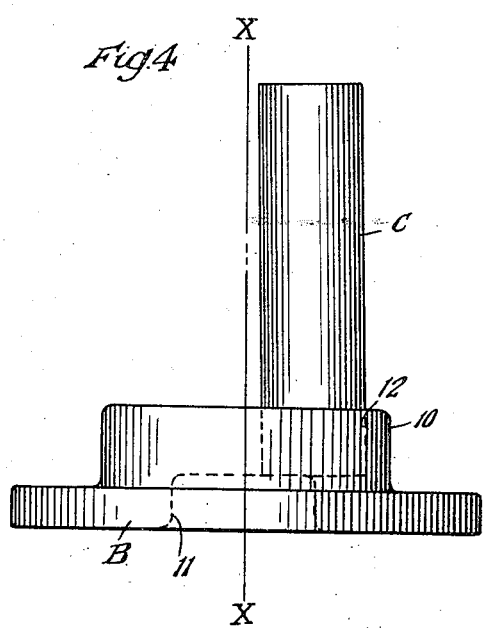

In the drawing forming a part of this specification, Figure 1 is a front elevational view of my improved shock absorber showing the spring in vertical section. Figure 2 is a transverse horizontal sectional view, corresponding substantially to the line 2—2 of Figure 1. Figure 3 is a top plan view of the improved shock absorber. Figure 4 is a front elevational view of the lower friction bar and its follower.

My improved shock absorber comprises broadly a pair of end followers A and B, three friction spring bars C, D, and E, and a spring F.

The followers A and B, which are of similar design, except as hereinafter pointed out, are respectively arranged at the bottom and top of the mechanism. Each follower is in the form of a disclike plate having a central cylindrical boss 10, the boss of the follower A upstanding therefrom and that of the follower B depending from the same. Each follower has a central seat 11 therein, the seat of the follower A opening downwardly and that of the follower B opening upwardly. The seats 11—11 of the two followers are designed to accommodate the centering projections of the lower and upper spring plates of the truck spring cluster of a railway car. The boss 10 of the lower follower A is provided with an upwardly opening socket at one side of the central vertical axis of the mechanism, and the boss 10 of the upper follower B is provided with a pair of spaced, downwardly opening sockets at the other side of said vertical axis, said sockets of the two followers being indicated by 12—12—12.

The three friction spring bars C, D, and E are identical, each bar being of cylindrical transverse cross section. The three bars C, D, and E are arranged symmetrically about the central vertical axis of the mechanism, the bar C being fixed to the lower follower A and the bars D and E being fixed to the upper follower B. The bar C upstands from the lower follower A having its lower end seated in the socket 12 of the boss 10 of said follower. The bars D and E depend from the upper follower B and have their upper ends seated in the sockets 12—12 of the boss 10 of said upper follower. The ends of the bars C, D, and E are preferably welded within the sockets 12. The bar C of the follower A has lengthwise sliding engagement with the bars D and E of the follower B, said bars being flexed in the assembled condition of the mechanism, as shown in Figure 1, whereby the engaging longitudinal surfaces thereof are held in tight frictional contact, said surfaces forming friction faces of said bars.

In order that the bars C, D, and E are properly flexed in the assembled condition of the mechanism, they are secured to the followers in slightly inclined relation to the central vertical axis of the mechanism, that is, the bar C is inclined toward said central axis in upward direction and the bars D and E are inclined toward said axis in downward direction. This is accomplished by disposing the sockets 12 of the followers at a slight inclination to the vertical. This is clearly illustrated in Figure 4, which shows the bar C and its follower A before being assembled with the other parts of the mechanism. As shown in Figure 4, the bar C is slightly inclined inwardly toward the vertical axis line X—X.

The spring F is in the form of a relatively heavy coil surrounding the friction spring bars C, D, and E and bearing at its top and bottom ends on the followers B and A, respectively. The opposite ends of the spring F embrace and snugly fit over and around the bosses 10—10 of the followers, thus resisting relative lateral displacement of the followers and the spring friction bars carried thereon. The spring F is preferably under initial compression when the shock absorber is in assembled condition between the top and bottom spring follower plates of the truck spring cluster of a railway car. Due to the pressure exerted on the followers by the spring F, the former are held flatly seated on the spring follower plates of the truck spring cluster, thereby holding the friction spring bars C, D, and E pressed tightly against each other, so that the portions of said bars which are in contact along their vertical sides assume a substantially vertical position, the bars being flexed at the ends thereof where they are secured to the followers. The inherent resiliency of the flexed bars creates sufficient pressure between the same to produce the desired frictional resistance against relative lengthwise sliding movement thereof.

My improved friction shock absorber preferably replaces one or more of the spring units of a truck spring cluster of a railway car, being interposed between the top and bottom spring follower plates of said cluster. However, more than one of said shock absorbers may be employed with a spring cluster, the same being substituted for two or more of the spring units of the same.

The operation of my improved shock absorber is as follows: Upon the spring cluster of the truck of a railway car being compressed between the spring follower plates of said cluster, the followers A and B are moved relatively toward each other against the resistance of the spring F, carrying the friction spring bars C, D, and E therewith, thereby effecting relative lengthwise sliding movement of the bars D and E with respect to the bar C with resultant friction therebetween. The action of the truck springs is thus effectively snubbed or dampened. Compression of the mechanism is positively limited by engagement of the ends of the bars C and D—E with the bosses 10—10 of the spring followers B and A. Upon recoil of the truck springs, the spring follower plates of the spring cluster are separated, permitting the spring F to expand and return all of the parts to the normal position shown in Figure 1.

I claim:

1. In a friction shock absorber, the combination with a pair of end followers relatively movable toward and away from each other; of a spring bar projecting from one of said followers, said spring bar being on one side of the central longitudinal axis of the mechanism; a pair of spaced spring bars projecting from the other follower, said pair of bars being on the other side of said axis and having sliding engagement with said first named spring bar; and a coil spring surrounding said bars and opposing relative approach of said followers, said coil spring having shouldered engagement with said followers to hold the same against lateral displacement with respect to each other.

2. In a friction shock absorber, the combination with a pair of end followers relatively movable toward and away from each other; of a cylindrical spring bar projecting from one of said followers, said spring bar being on one side of the central longitudinal axis of the mechanism; a pair of spaced cylindrical spring bars projecting from the other follower, said pair of bars being on the other side of said axis and having sliding engagement with said first named spring bar; and a coil spring surrounding said bars and opposing relative approach of said followers, said coil spring having shouldered engagement with said followers to hold the same against lateral displacement with respect to each other.

3. In a friction shock absorber, the combination with a pair of end followers, relatively movable toward and away from each other; of a cylindrical boss on each follower; a set of three cylindrical friction spring bars, the inner ends of said bars being in lengthwise sliding engagement with each other, said bars being arranged symmetrically about the central longitudinal axis of the mechanism, one of said bars being rigidly secured at its outer end to the boss of one of said followers, and the remaining two bars being rigidly secured at their outer ends to the boss of the other follower; and a coil spring surrounding said bars and bearing at opposite ends on said followers, the opposite ends of said spring being telescoped over said bosses in gripping engagement therewith to oppose relative lateral displacement of said followers.

EDWARD H. LEHMAN.

REFERENCES CITED

The following references are of record in the file of this patent:

UNITED STATES PATENTS

| Number | Name | Date |
| --- | --- | --- |
| 709,999 | McCord | Sept. 30, 1902 |
| 1,127,657 | McCormick | Feb. 9, 1915 |
| 1,169,863 | Peycke | Feb. 1, 1916 |
| 1,938,715 | Miner | Dec. 12, 1933 |
| 1,097,050 | Schimmel | May 19, 1914 |